(12) United States Patent
Inoue

(10) Patent No.: US 6,219,777 B1
(45) Date of Patent: Apr. 17, 2001

(54) REGISTER FILE HAVING SHARED AND LOCAL DATA WORD PARTS

(75) Inventor: Toshiaki Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/113,291

(22) Filed: Jul. 10, 1998

(30) Foreign Application Priority Data

Jul. 11, 1997 (JP) .................................................... 9-202430

(51) Int. Cl.[7] .................................................. G06F 15/00
(52) U.S. Cl. ................................ 712/23; 712/10; 712/11; 712/15; 712/19
(58) Field of Search ................................. 712/23, 25, 4, 712/213, 215; 365/189.05; 714/10, 11

(56) References Cited

U.S. PATENT DOCUMENTS 5,613,152 * 3/1997 Van Meerbergen et al. .......... 712/23
5,644,780 * 7/1997 Luick ..................................... 712/23
5,777,928 * 7/1998 Vidwans et al. ................. 365/189.05

FOREIGN PATENT DOCUMENTS

| 62-164155 | 7/1987 | (JP) . |
| 63-47835 | 2/1988 | (JP) . |
| 63-186363 | 8/1988 | (JP) . |
| 2-116949 | 5/1990 | (JP) . |
| 405233281 * | 2/1992 | (JP) . |

* cited by examiner

Primary Examiner—Meng-Ai T. An
Assistant Examiner—Wen Tai Lin
(74) Attorney, Agent, or Firm—Sughrue, Mion, Zinn, Macpeak & Seas, PLLC

(57) ABSTRACT

Disclosed is a register file used in a multiprocessor composition composed of a plurality of processor elements, the register file having a plurality of words and being provided for each of the plurality of processor elements, wherein: the plurality of words are divided into a word part that can be simultaneously accessed by some of the plurality of processor elements to use in common with other processor element, and a word part that can be accessed only by its own processor element.

2 Claims, 7 Drawing Sheets

REGISTER FILE HAVING SHARED AND LOCAL DATA WORD PARTS

FIELD OF THE INVENTION

This invention relates to a register file used in a multiprocessor and the like.

BACKGROUND OF THE INVENTION

Along with an increase in integration density, the quantity of hardware, such as operation units, that can be mounted in a processor is increased. In a processor that several operations can be in parallel executed, such as a superscalar processor and a VLIW (very long instruction word) processor, several operation units are in parallel driven to enhance the processing performance. However, to maintain the parallel processing performance in such kind of processors, a register file with the multi-port structure that allows to be simultaneously supplied with data and to be simultaneously written of a result of operation according to the number of operation units driven simultaneously is required.

For example, R10000, a superscalar processor made by MIPS corp. employs a register file for integer operation that has 10 ports (7 read ports and 3 write ports) to enable the parallel execution of four instructions (two integer-operation instructions, one load/store instruction and one branch instruction).

When several superscalar processor elements can be mounted due to a further enhanced integration density, a mechanism that enables the high-speed access to common data between the processor elements is necessary to maintain the parallel processing performance. In this regard, a system that common data are left on a register file, without storing in a cache or main storage, to allow several processor elements to access them is effective. Such a system can be realized by increasing the number of ports of the register file, like the case of the superscalar processor.

FIG. 1 shows an example of a processor with four superscalar processor elements that can execute in parallel two operation instructions. Referring to FIG. 1, when all processor elements 601 to 604 use commonly data stored in a register file 605, the register file 605 has only to have 20 ports (16 for reading and 8 for writing) at the maximum because two operation units in each processor use two read ports and one write port of the register file 605.

In contrast with this, by restricting a register accessible from each of instruction to be in parallel executed, the number of ports of a register file can be decreased while maintaining the number of instruction to be in parallel executed.

FIG. 2 shows an example of a VLIW machine. Referring to FIG. 2, a instruction group 701 of four instructions executable in parallel is divided into two instruction groups 702, 703, each of which is of two instructions, and register files 704, 705 are assigned separately to processor elements 712, 713 to process these instruction groups. The instruction group 702 executes the operation by using operation units 706, 707 and accesses the register file 704. Similarly, the instruction group 703 executes the operation by using operation units 709, 710 and accesses the register file 705.

When the processor element 713 uses data stored in the register file 704, the data are transferred from the register file 704 through a selector 711 to the register file 705. The selector 711 is controlled to select the output result from the operation unit 710 for an ordinary operation instruction, and it is controlled to select the output of the register file 704 when the inter-register transfer instruction is executed. In like manner, a selector 708 is controlled by the inter-register transfer instruction from the register file 705 to the register file 704.

In such a composition, a register file with 6 ports (4 read ports and 2 write ports) has only to be provided for each instruction group (each processor element). Namely, the register file has only to have ports half as many as 12 ports (8 read ports and 4 write ports) required in the case that all the four instructions use commonly one register file.

For example, Japanese patent application laid-open No.5-233281(1993) discloses a high-performance calculator that enhances the separation between processor elements and facilitates the chip layout, by using such a technique.

In the composition shown in FIG. 1, the processor element can easily use common data with the other processor element and rapidly access data produced by the other processor element. However, in this composition, there is a problem that a scalable enhancement in performance cannot be obtained because the port number of register file, i.e., its delay and area, is increased with the number of operation units mounted on the processor element. Also, for a program, such as a program for image processing, that has a high instruction-independency and data-localization and uses few common data between processor elements, it is useless since the port number is more than is needed.

On the other hand, in the composition shown in FIG. 2, the port number of register file can be reduced, but it needs the operation to transfer data between register files when data to be used exists in a register file assigned to another processor element. This operation is conducted by the inter-register transfer instruction, therefore causing an overhead and thereby damaging high-speed access.

SUMMARY OF THE INVENTION

Accordingly, it is an object of the invention to provide a register file that an increase in port number due to parallel processing can be prevented and an overhead in accessing common data between processor elements can be suppressed.

According to the invention, provided is a register file used in a multiprocessor composition composed of a plurality of processor elements, the register file having a plurality of words and being provided for each of the plurality of processor elements, wherein: the plurality of words are divided into a word part that can be simultaneously accessed by some of the plurality of processor elements to use in common with other processor element, and a word part that can be accessed only by its own processor element.

In this invention, the following effects can be obtained.

First, when several processor elements have a register file in common, the register file does not need to be provided with ports required to access simultaneously from all the processor elements. Therefore, an increase in area and delay with an increase in the number of ports can be prevented.

The reason is as follows: For example, when four processor elements, each of which includes two operation units with two inputs and one output, have a register file used for their operations in common, the number of ports required for writing and reading is 20. In contrast with this, a register file of this invention that only two adjacent processor elements have part of mutual register files in common has only to have 12 ports for the common part and 6 ports for the non-common part. For example, in FIG. 3, 6 ports (4 read ports and 2 write ports) for R8 to R23 and 12 ports (8 read ports and 4 write ports) for R0 to R7 and R24 to R31 are needed. Thus, the port number can be significantly decreased and the area and delay can be therefore reduced as well. This effect can be obtained regardless of the number of operation units and processor elements.

Second, when several processor elements access common data, it is not necessary to execute a specific data transfer operation by software between register files assigned to the processor elements. Namely, an overhead in accessing common data can be removed.

This is because part of a register file owned by a processor element is used in common with part of a register file owned by another processor element and a memory cell as the common part is provided with ports that can be simultaneously accessed by the two processor elements.

Third, in accessing a local register part of register file from a processor element, deterioration in performance due to decrease of register can be prevented.

This is because false dependence relations (reverse-dependence or output-dependence) caused by using the register in common can be reduced by renaming a local logical register into a wider physical register. Therefore, an overhead due to useless access to main storage can be reduced.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
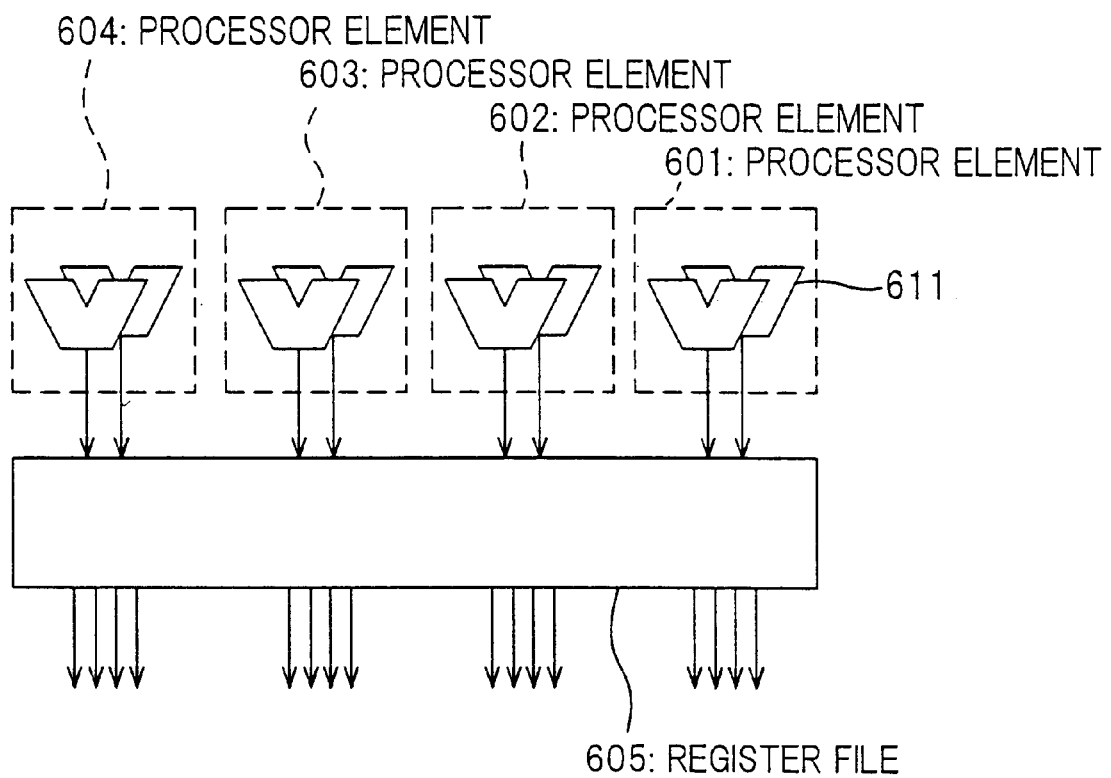
FIG. 1 is a block diagram showing the composition of a conventional register file.
Figure 2:
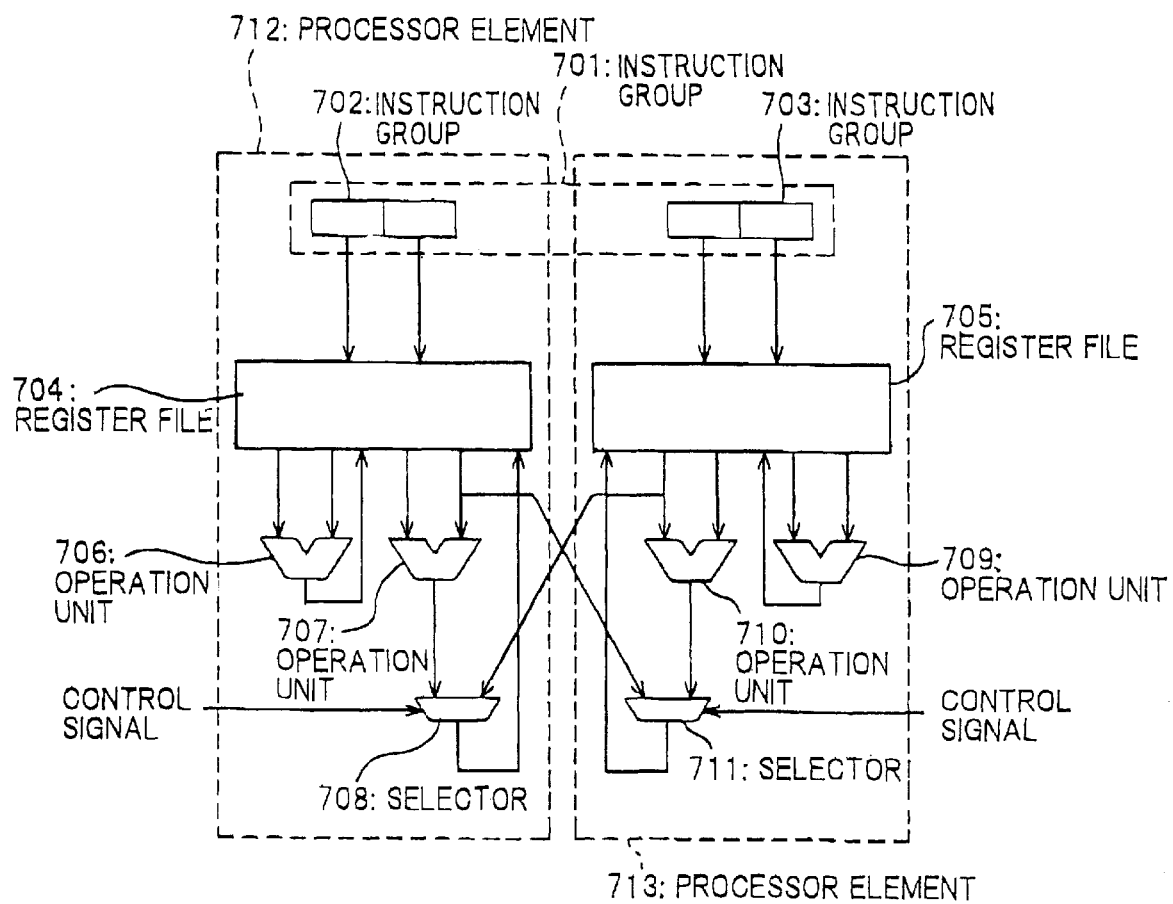
FIG. 2 is a block diagram showing the composition of another conventional register file.
Figure 3:
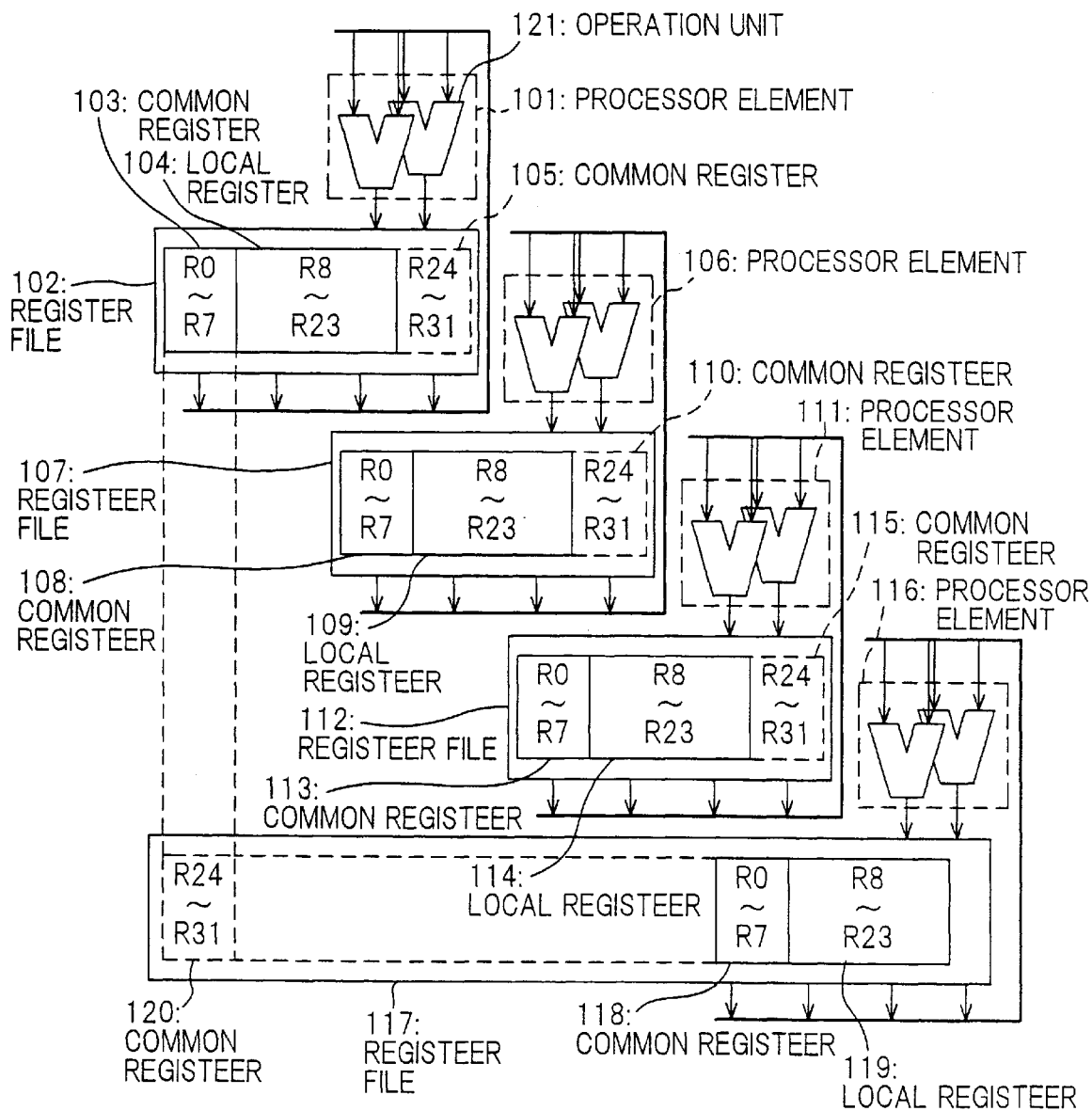
FIG. 3 is a block diagram showing the composition of a register file in a first preferred embodiment according to the invention.

A register file in the first preferred embodiment will be explained in FIG. 3. Referring to FIG. 3, a processor element 101 comprises two operation units with two inputs and one output, and a register file 102 is provided with four read ports and two write ports.

The processor element 101 and the register file 102 are so connected that the two operation units can operate in parallel. Namely, the processor element 101 can read out simultaneously four register contents at the maximum to be designated through an operation instruction from the register file 102 and then supply them to the two operation units, and, simultaneously, it can write two operation results at the maximum in registers to be designated through the operation instruction.

The above composition and operation of the processor element 101 and register file 102 are similar to those of a processor element 106 and a register file 107, a processor element 111 and a register file 112, and a processor element 116 and a register file 117.

Meanwhile, the register file 102 comprises 32 registers (R0 to R31), which is divided into three regions, a common register 103 (R0 to R7), a common register 105 (R24 to R31) and a local register 104 (R8 to R23). The local register 104 can be accessed only by the processor element 101 and cannot be accessed by the other processor elements.

On the other hand, the common register 105 (R24 to R31) represents the same contents as a common register 108 (R0 to R7) included in the register file 107 owned by the processor element 106, and it can be accessed by both the processor element 101 and the processor element 106.

Similarly, a local register 109 included in the register file 107 owned by the processor element 106 can be accessed only by the processor element 106. A common register 110 represents the same contents as a common register 113 included in the register file 112 owned by the processor element 111.

Similarly, a local register 114 included in the register file 112 owned by the processor element 111 can be accessed only by the processor element 111. A common register 115 represents the same contents as a common register 118 included in the register file 117 owned by the processor element 116.

Similarly, a local register 119 included in the register file 117 owned by the processor element 116 can be accessed only by the processor element 116. A common register 120 represents the same contents as the common register 103 included in the register file 102 owned by the processor element 101.

Figure 4:
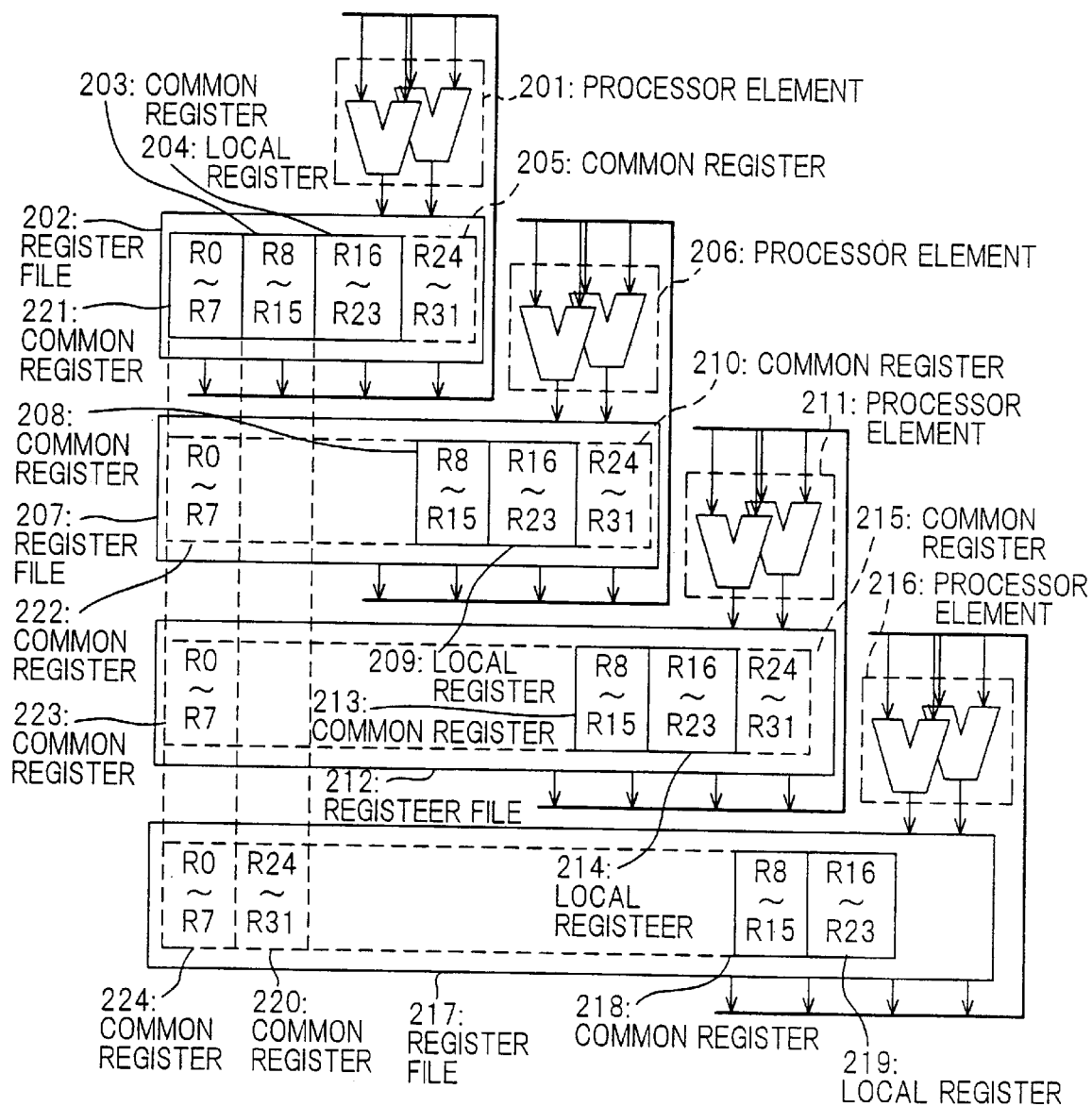
FIG. 4 is a block diagram showing the composition of a register file in a second preferred embodiment according to the invention.

A register file in the second preferred embodiment will be explained in FIG. 4. Referring to FIG. 4, a processor element 201 comprises two operation units with two inputs and one output, and a register file 202 is provided with four read ports and two write ports.

The processor element 201 and the register file 202 are so connected that the two operation units can operate in parallel. Namely, the processor element 201 can read out simultaneously four register contents at the maximum to be designated through an operation instruction from the register file 202 and then supply them to the two operation units, and, simultaneously, it can write two operation results at the maximum in registers to be designated through the operation instruction.

The above composition and operation of the processor element 201 and register file 202 are similar to those of a processor element 206 and a register file 207, a processor element 211 and a register file 212, and a processor element 216 and a register file 217.

Meanwhile, the register file 202 comprises 32 registers (R0 to R31), which is divided into four regions, a common register 221 (R0 to R7), a common register 203 (R8 to R15), a common register 205 (R16 to R31) and a local register 204 (R8 to R23). The local register 204 can be accessed only by the processor element 201 and cannot be accessed by the other processor elements.

On the other hand, the common register 205 (R24 to R31) represents the same contents as a common register 208 (R8 to R15) included in the register file 207 owned by the processor element 206, and it can be accessed by both the processor element 201 and the processor element 206.

Similarly, a local register 209 included in the register file 207 owned by the processor element 206 can be accessed only by the processor element 206. A common register 210 represents the same contents as a common register 213 included in the register file 212 owned by the processor element 211.

Similarly, a local register 214 included in the register file 212 owned by the processor element 211 can be accessed only by the processor element 211. A common register 215 represents the same contents as a common register 218 included in the register file 217 owned by the processor element 216.

Similarly, a local register 219 included in the register file 217 owned by the processor element 216 can be accessed only by the processor element 216. A common register 220 represents the same contents as the common register 203 included in the register file 202 owned by the processor element 201.

Also, the common register 221 included in the register file 202 owned by the processor element 201 represents the same contents as a common register 222 included in the register file 207 owned by the processor element 206, a common register 223 included in the register file 212 owned by the processor element 211, and a common register 224 included in the register file 217 owned by the processor element 216, and it can be accessed by all the processor elements.

The register files in the first and second embodiments are explained in FIGS. 3 and 4. However, in this invention, the number of processor elements, the number of operation units in processor element, the total word number of a register file, and the word number of a common register or local register can be a arbitrary number. Namely, this invention is not limited to the compositions shown in FIGS. 3 and 4.

Also, in the first and second embodiments, two adjacent processor elements have part of a register file in common. However, in this invention, three or more adjacent processor elements may have part of a register file in common.

Figure 5:
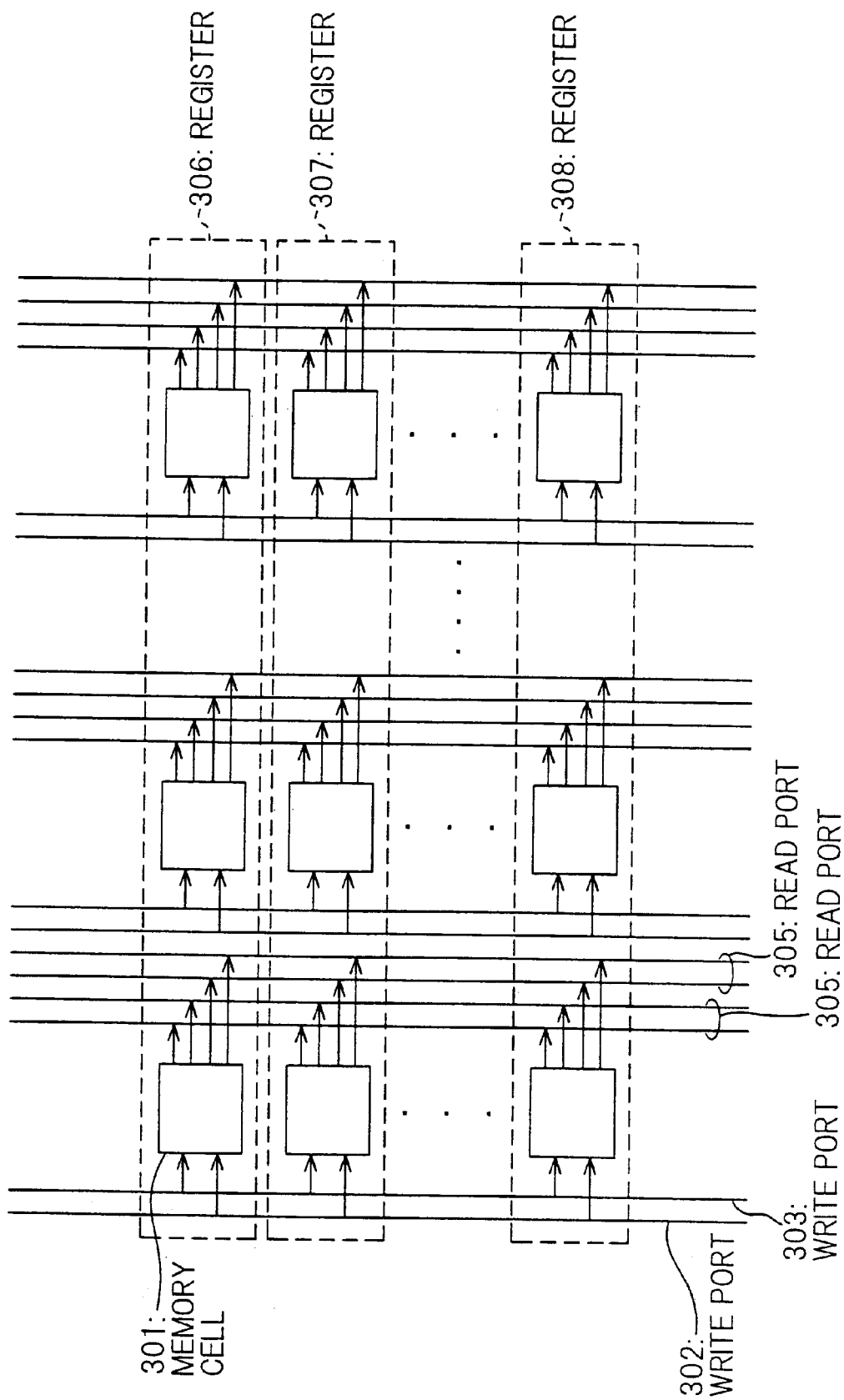
FIG. 5 is a block diagram showing an example of a composition of memory cells in the register file in the first or second embodiment.

FIG. 5 shows an example of common part to other processor element in a memory cell composing a register file in this invention.

Memory cells 301 are provided with two sets of write ports 302, 303 and two sets of read ports 304, 305. A register 306 is composed disposing in parallel memory cells similar to the memory cell 301 as many as a bit number to be defined by a word length. The register file is composed further connecting memory cells to be defined by a word number to the same port.

Here, a pair of the write port 302 and read ports 304 is assigned to accessing from one processor element, and a pair of the write port 303 and read ports 305 is assigned to accessing from another processor element.

By composing thus, common use of data between two processor elements can be implicitly realized. Namely, it is not necessary for the processor element to use a specific means, such as a data transfer instruction, to access common data.

Figure 6:
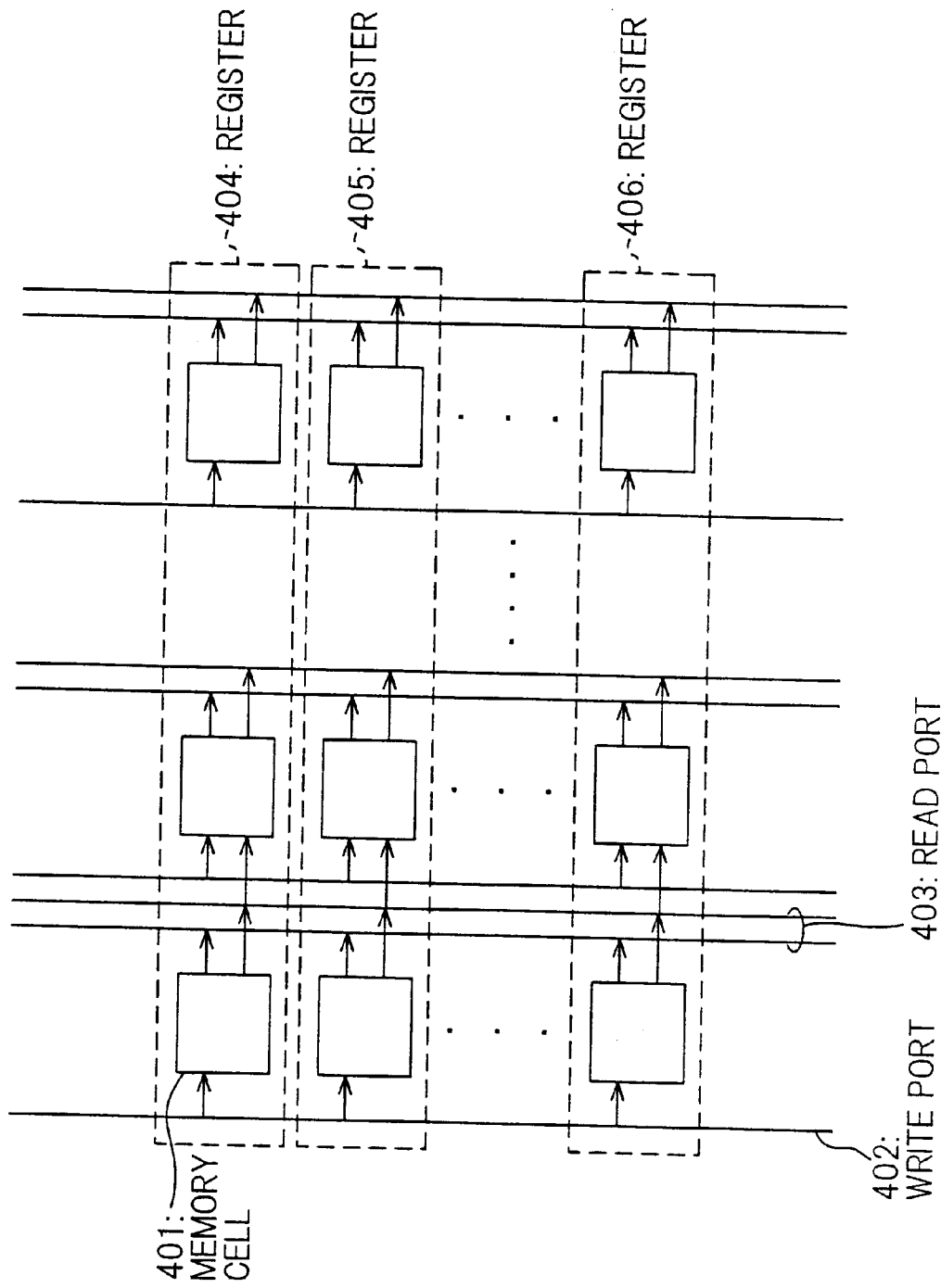
FIG. 6 is a block diagram showing another example of a composition of memory cells in the register file in the first or second embodiment.

FIG. 6 shows another example of common part to other processor element in a memory cell composing a register file in this invention.

Memory cells 401 are provided with one set of write ports 402 and one set of read ports 403. Registers 404, 405 and 406 are composed disposing the memory cells 401 in a like manner shown in FIG. 5.

Here, the write port 402 is assigned to as a write-only port for one processor element, and the read ports 403 is assigned to as a read-only port for another processor element.

By composing thus, common use of data between two processor elements can be implicitly realized, similarly to the example in FIG. 5.

The above compositions in FIGS. 5 and 6 are explained for a memory cell as common part in register file in the case that the processor element includes one operation unit with two inputs and one output. However, the port number of a memory cell can be varied according to the number of operation units included in a processor element. For example, when each of two processor elements includes two operation units with two inputs and one output that can be operated in parallel, memory cells corresponding to those in FIG. 5 can be provided with four sets of write ports and four sets of two read ports and memory cells corresponding to those in FIG. 6 can be provided with two sets of write ports and two sets of two read ports. Also, this invention can be similarly applied even when processor elements have operation units with different compositions.

Figure 7:
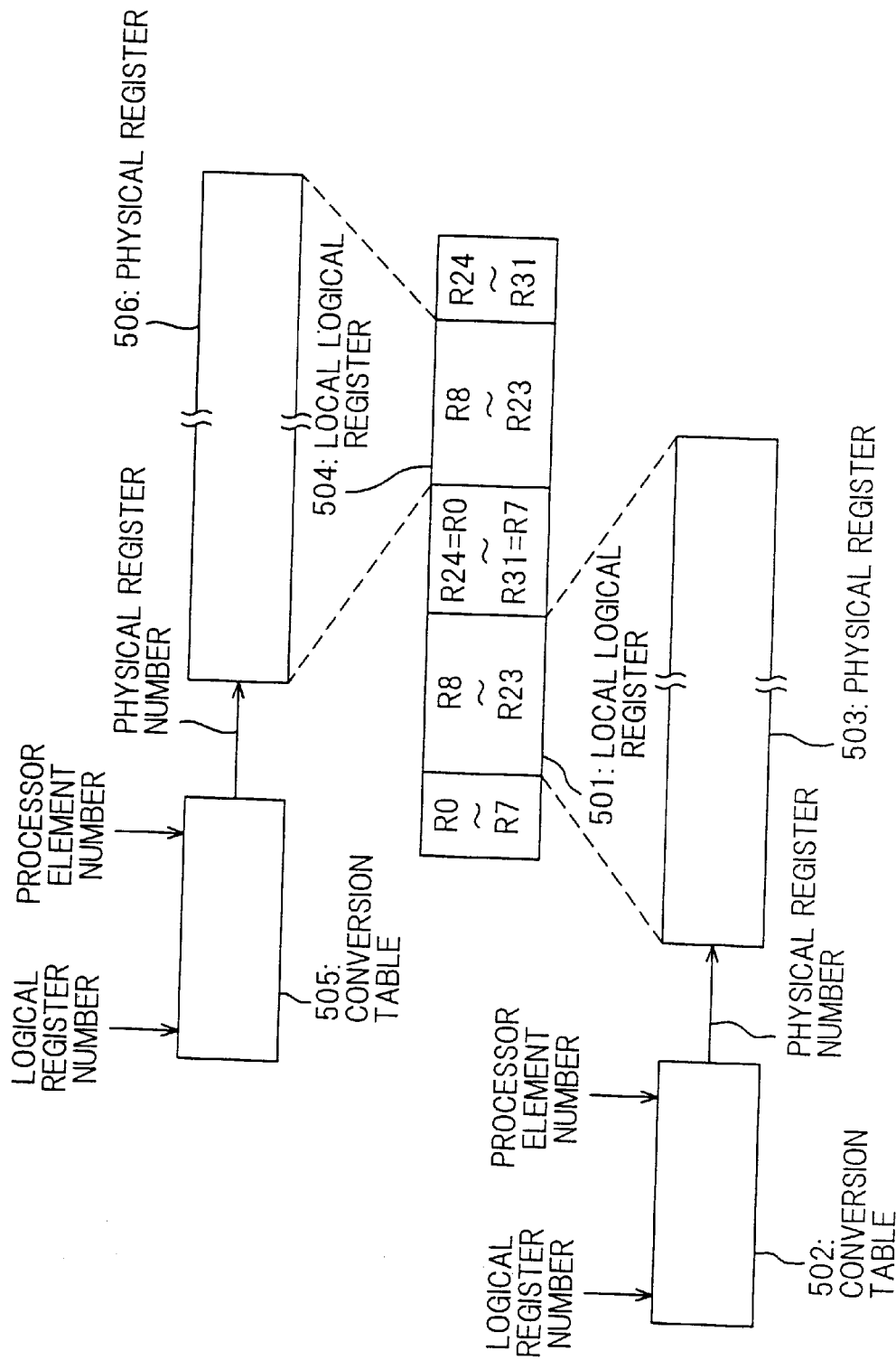
FIG. 7 is an illustration showing an example of a register conversion part of the register file in the first or second embodiment.

FIG. 7 shows an example of register number conversion part in a register file of this invention. Referring to FIG. 7, a local logical register 501 can be accessed only by a processor element owning this, and it is a logical register that is designated by using a register number within an operation instruction executed by the processor element. Also, a physical register 503 is mounted on hardware and it is a register file composed of registers more than the number of local logical registers (16 registers of R8 to R23). A conversion table 502 is a table that makes the local logical register 501 correspond arbitrarily to the physical register 503 by using a processor element number designating a processor element and a local logical register number designated by the operation instruction. Similarly, a local logical register 504, a conversion table 505 and a physical register 506 belong to another processor element, and their conversion mechanism is composed and operated in like manner.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A register file, used in a multiprocessor data system comprising a plurality of processor elements, said register file storing and providing a plurality of data words, wherein:

said plurality of data words are divided into a first data word part that can be commonly accessed by a first set of said plurality of processor elements and a second set of said plurality of processor elements, and a second data word part that can be accessed only by a local processor element, and wherein:

of n data words ($n \geq 3$) of a register file owned by a first processor element, i data word ($1 \leq ni \leq n-2$) is provided with ports that are used in common with a second processor element and can be simultaneously accessed by said first processor element and second processor element, j data word ($1 \leq j \leq n-i-1$) is provided with ports that are used in common with a third processor element and can be simultaneously accessed by said first processor element and third processor element, and (n-i-j) data word is provided with ports that can be accessed only by said first processor element.

2. A register file, used in a multiprocessor data system comprising a plurality of processor elements, said register file storing and providing a plurality of data words, wherein:

said plurality of data words are divided into a first data word part that can be commonly accessed by a first set of said plurality of processor elements and a second set of said plurality of processor elements, and a second data word part that can be accessed only by a local processor element, and wherein: of n data words ($n \geq 4$) of register file owned by a first processor element, i data word ($1 \leq i \leq n-3$) is provided with ports that are used in common with a second processor element and can be simultaneously accessed by said first processor element and second processor element, j data word ($1 \leq j \leq n-i-2$) is provided with ports that are used in common with a third processor element and can be simultaneously accessed by said first processor element and third processor element, k data word ($1 \leq k \leq n-i-j-1$) is provided with ports that can be accessed by all processor elements and (n-i-j-k) data word is provided with ports that can be accessed only by said first processor element.

* * * * *